Nov. 13, 1928.
E. C. KASTNER
1,691,763
ELECTRICAL CUTTER FOR CIRCULAR MANDREL TUBES
Filed Dec. 29, 1926   2 Sheets-Sheet 1
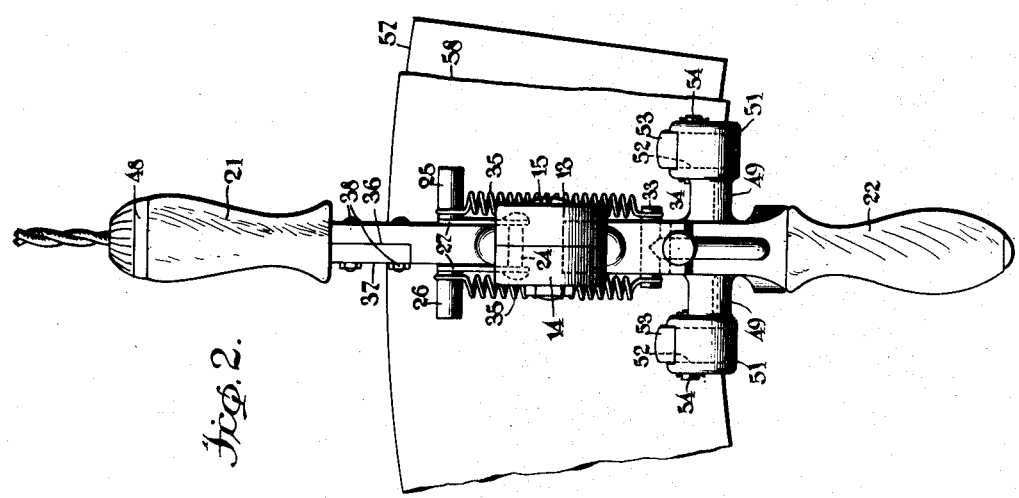
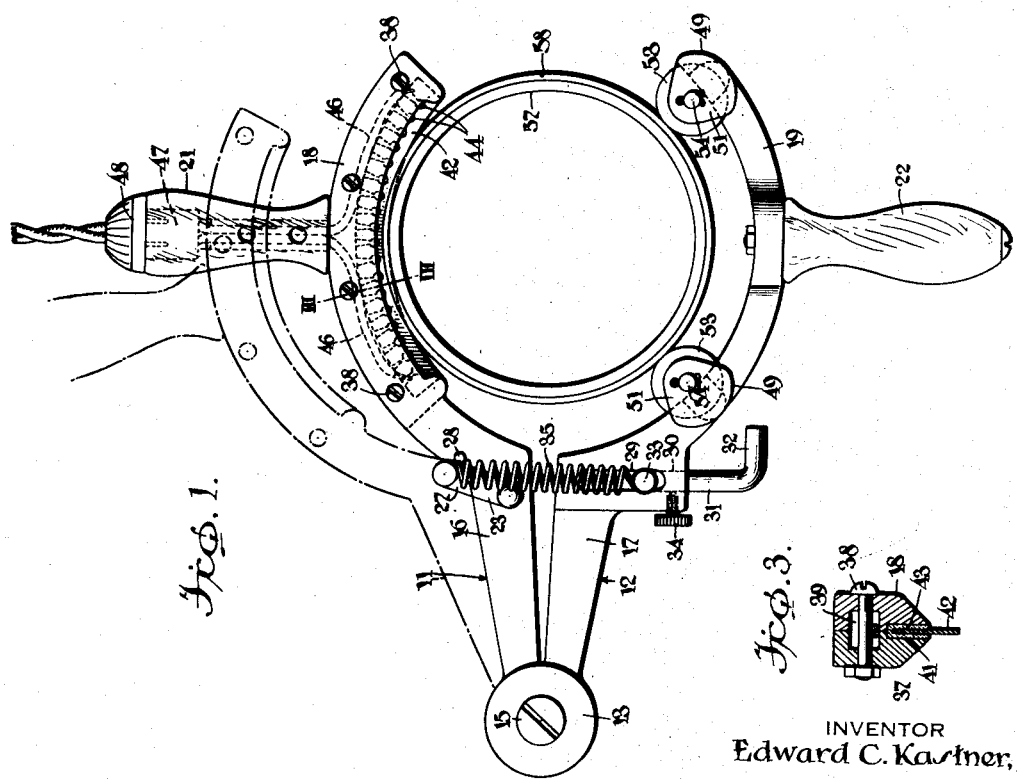
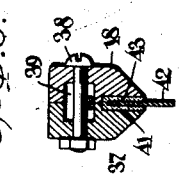
INVENTOR
Edward C. Kastner,
BY
R. S. Trogner
ATTORNEY Nov. 13, 1928.  E. C. KASTNER  1,691,763
ELECTRICAL CUTTER FOR CIRCULAR MANDREL TUBES
Filed Dec. 29, 1926  2 Sheets-Sheet 2
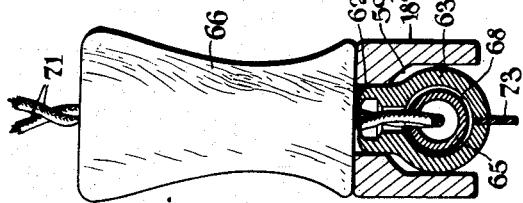
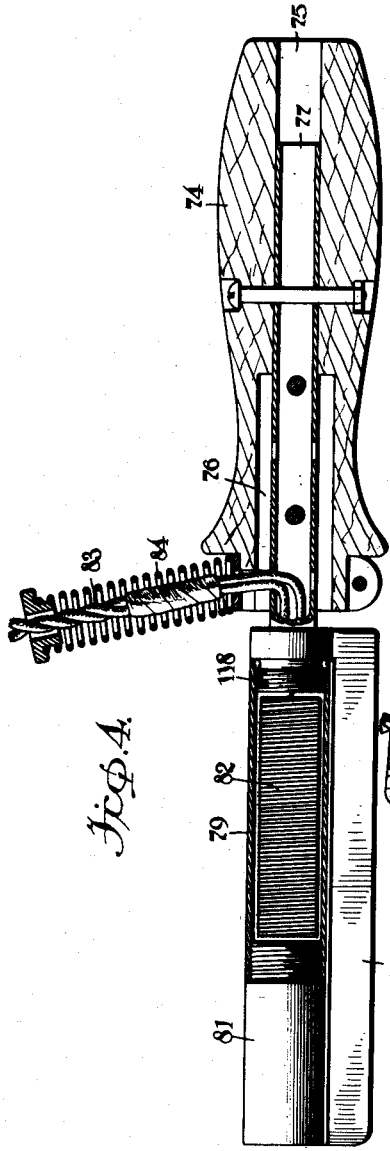
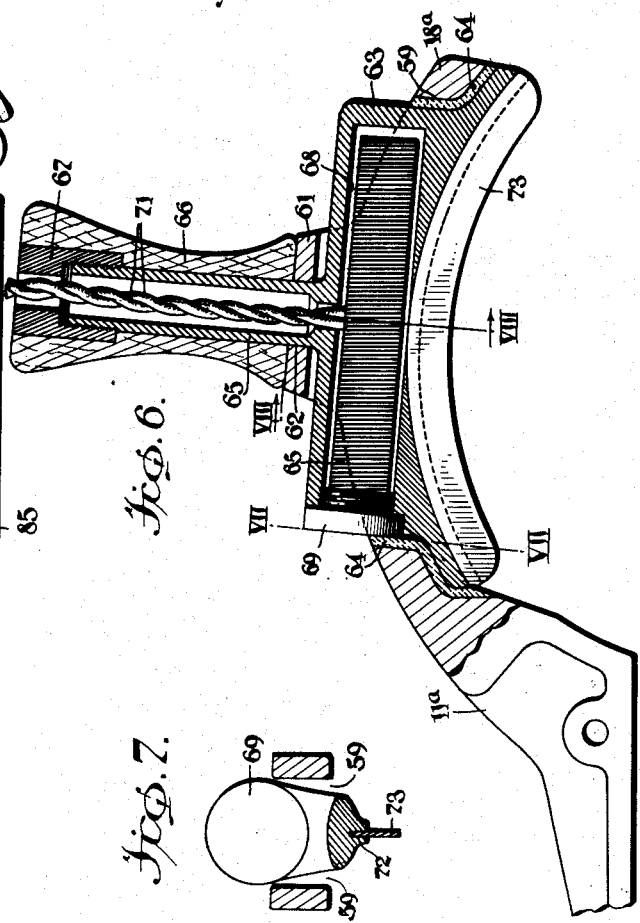
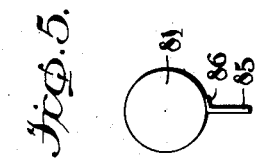
INVENTOR
Edward C. Kastner,
BY R.S. Trogner
ATTORNEY Patented Nov. 13, 1928.

1,691,763

UNITED STATES PATENT OFFICE.

EDWARD C. KASTNER, OF AKRON, OHIO, ASSIGNOR TO THE GOODYEAR TIRE & RUBBER COMPANY, OF AKRON, OHIO, A CORPORATION OF OHIO.

ELECTRICAL CUTTER FOR CIRCULAR-MANDREL TUBES.

Application filed December 29, 1926. Serial No. 157,690.

My invention relates generally to cutting tools and it has particular relation to a device of the above designated character which may be employed for the purpose of cutting pneumatic inner tubes to the proper length after they have been drawn upon the curing mandrels and prior to the curing operation.

One object of my invention is to construct a cutting tool which is capable of performing the trimming operation referred to above in a clean and precise manner and which is, at the same time, capable of severing the material of the tube at a relatively high rate of speed.

Another object of my invention is to construct a cutting tool that is capable of performing the cutting operation upon the tubes in a satisfactory manner without, at the same time, cutting or injuring the mandrel upon which the tube is supported.

One of the known methods of manufacturing pneumatic tire casing tubes involves the use of curved approximately circular steel or aluminum mandrels. By this method the stock is prepared in tubular form by an extruding machine and thereafter is cut into lengths somewhat greater than are actually required for the finished tube. The mandrel is supported in a horizontal position in any convenient manner and the stock is blown up and pulled upon the mandrel. During this operation the tube is generally stretched to a length somewhat greater than the length of the original stock and the differences in length resulting therefrom is not uniform. It is therefore necessary again to cut the stock to the proper length after it has been drawn upon the mandrels.

Prior to my invention, straight steel knives have been employed in performing this cutting operation and as rubber stock is somewhat tough, it was necessary that the knife be very sharp. The mandrels, although constructed of a metallic substance, were themselves injured by the knife during the operation of cutting the tube to length and after a short period of service, the surface of the mandrels became so scratched that they were required to be refinished. After several refinishing operations, this section of the mandrel where the cutting operation was performed became so reduced in diameter that it was unfit for further use.

With a view to avoiding the defects and disadvantages of the method above described, I have constructed a tool for cutting tube stock to predetermined lengths upon circular mandrels which is electrically heated and which will quickly and completely accomplish the above mentioned operation without, in any way, injuring the mandrel upon which the tube is supported. In accordance with my invention, a knife blade is adapted to be heated to a relatively high degree of temperature, and it is therefore possible to sever the tube stock with a blade that is actually relatively dull without injuring the surface of the mandrel to any appreciable extent.

For a better understanding of my invention, reference may now be had to the accompanying drawings forming a part of this specification, in which:

Fig. 1 is a side elevational view illustrating one form of my invention;

Fig. 2 is an end elevational view of the device illustrated in Fig. 1;

Fig. 3 is a cross-sectional view taken substantially along the line III—III of Fig. 1;

Fig. 4 is a view, partially in elevation and partially in cross-section, illustrating another form which my invention may assume;

Fig. 5 is an end elevational view of the knife supporting portion of the device illustrated in Fig. 4;

Fig. 6 is a fragmentary cross-sectional view illustrating another form of the device embodying the invention;

Fig. 7 is a cross-sectional view taken substantially along the line VII—VII of Fig. 6; and Fig. 8 is a view, partially in elevation and partially in section, taken substantially along the line VIII—VIII of Fig. 6.

In practicing my invention I employ a pair of arms 11 and 12, which are provided at one end with offset circular lugs 13 and 14. The lugs 13 and 14 are provided with axially aligned openings and a bolt 15, which is adapted to fit snugly within the openings, provides a pivotal element for the arms 11 and 12.

The arms 11 and 12 each comprise straight portions 16 and 17 and arcuate portions 18 and 19. Handles 21 and 22 are secured to the arcuate portions 18 and 19 respectively. The straight portion 16 of the arm 11, at a point adjacent the arc shaped portion 18, is provided with a bearing 24 which supports a crank 23. The crank 23 comprises a main bearing 24 and two offset portions 25 and 26, which are connected by the plates 27. Lugs 28 project from either side of the arm 11 and these lugs act as a stop to prevent the rotation of the crank 23 in one direction.

An elongated opening 29 is formed within the arm 12 and the length of this opening is approximately in alignment with a point midway between the center of the lugs 28 and the main bearing portion 24 of the crank 23. A T-shaped member 31, provided with a bent portion 32, is slidably mounted within an opening 30 in the arm 12 that communicates with the end of the opening 29 and is in alignment therewith. A transverse end portion 33 of the T-shaped member 31 extends across and projects from the opening 29, in parallel relation to the pins 25 and 26. A set screw 34 is threaded into the member 11 and is adapted to retain the T-shaped member 31 within the opening 29 in adjusted position.

A pair of springs 35 are connected at either end to the pins 25 and 26 and the cross portion 33 of the T-shaped member 31. Grooves may be provided upon the various supporting members in order that the springs may be permanently positioned thereupon.

It will be noted that the pins 25 and 26 project outwardly a considerable distance beyond the springs 35, and these portions are adapted to be grasped by the fingers in order to change the position of the crank arm 23.

A recess 36 is formed in one side of the curved portion 18 of the arm 11 and this recess is adapted to be occupied by an arcuate member 37. The recess 36 is so formed in the curved portion 18 that the member 37 positioned therein may be approximately symmetrical and complementary to the arcuate portion 18. The sections 18 and 37 are held firmly together by means of bolts or screws 38. An opening 39 is formed throughout the length of the members 18 and 37 and this opening extends an equal distance within each of the members. A recess 41, also symmetrical with respect to the members 18 and 37, is provided in the lower portion of this assembly and this recess is adapted to form clamping shoulders for a blade 42.

The blade 42 may be constructed of any metallic substance having high electrical resistance and other suitable characteristics, and I have found nichrome to be a very satisfactory material for the purpose of this invention. The blade 42 must necessarily be insulated from the other metallic elements of the device, and I have employed strips of mica 43 for this purpose. The insulating material must be capable of resisting a relatively high degree of compression stress and any material other than mica having the requisite properties may be utilized.

In order to insure a high temperature along the cutting edge of the blade 42, I have arranged a row of elongate openings or recesses 44, the inner extremities of which are equidistant from and closely adjacent the cutting edge, while the outer extremities thereof are located at the edge of the blade opposite the cutting edge. Electrical conductors 46 are welded or otherwise secured to either end of the blade 42 and the opposite ends of the conductors terminate within an electrical socket 47. A plug 48 is provided for the socket 47 and is adapted when in position therein, to establish the flow of electrical energy through the blade 42.

It is evident from the construction of the blade 42, in view of the openings provided therein, that the current will flow only through the cutting edge of the blade and it is therefore possible to maintain this portion at a high temperature.

Two spaced pairs of oppositely disposed arms 49 project from the curved portion 19 of the arm 12 and an enlarged portion 51 is formed at the extreme end of each of the arms 49. Recesses 52 are provided in the enlarged portions 51 and rollers 53 are rotatably mounted within the recesses upon pins 54.

Having now described in detail one form which my invention may assume, I will now describe the operation of that device as it is adapted to be employed in cutting tubes positioned upon mandrels.

A mandrel 57, having a tube 58 stretched thereon, is supported in a horizontal position in any convenient manner not shown. The crank arm 23 is rotated in an anti-clockwise direction away from the lugs 28 and the tension of the springs 35 continues the rotation of the crank about its axis after the portions 25 and 26 have been moved a sufficient distance to become out of alignment with the bearing portion 24 and the portion 33 supporting the opposite end of the springs. The arms 11 and 12 may then be opened as indicated by the dot and dash lines illustrating the arm 11 in Fig. 1 and the device is placed about the mandrel at the point where the operation is to be performed. The arms may then be closed and the crank arm 23 rotated into position against the lug 28. This rotation of the crank again tensions the springs 35, and the arms 11 and 12 tend to force the blade 42 into the material of the tube. Thereafter the device may then be grasped by both handles 21 and 22 and rotated 360°.

From the relative position of the rollers on the arm 12 and the blade on the arm 42, it is evident that the rotation of the device will tend to sever the tube in a line which lies entirely within a plane perpendicular to the axis of the mandrel at the point of application, and the knife, having been heated to a relatively high temperature cleanly severs the end portion of the tube. The blade 42, as shown by Fig. 3, may be relatively narrow but not sharpened, and obviously there is no tendency for the blade to injure the mandrel.

In Fig. 6 I have illustrated another form which my invention may assume that comprises an arm 11ª which may be substituted for the arm 11 of the construction illustrated by Fig. 1. In this form, an opening 59 is formed in the arcuate portion 18ª of the member 11ª and the top of this opening is bridged by a slightly elevated horizontal portion 61, provided with an opening 62 centrally arranged above the opening 59. An irregular shaped heat exchange element 63 is adapted to be positioned within the opening 59, and insulating material 64, which may be sheet asbestos or any other suitable material, prevents the unrestricted loss of heat to the member 11ª. I have found copper to be very satisfactory for the construction of the heat exchange element 63, but obviously any other material having a relatively high heat exchange coefficient may be employed.

A tubular extension 65 projects from the top of the element 63 and extends through the opening 62. A wooden handle 66, provided with an opening in the center thereof, is adapted to fit over the member 65 and an internally threaded collar 67 is threaded upon the outer end of the member 65.

The member 63 is provided with a longitudinally extending opening 68 having an internally threaded portion at one end and adapted to receive a standard electrical heating element 69. The heating element 69 is of well known construction and comprises a core of any suitable non-conducting material surrounded by a coil of high resistance wire. Insulated wires 71 are connected in any convenient manner to the heating elements 69 and are adapted to communicate with a suitable source of electrical energy.

The side of the heat exchange element 63 opposite the handle 66 is recessed as indicated at 72 for the purpose of receiving a metallic strip 73, which serves as a cutting blade. The blade 73 may be constructed of steel or bronze, or of any other metallic substance having similar heat exchange properties.

The operation of this form of my invention is of course identical to the operation of the form illustrated by Fig. 1, which has been heretofore described.

The form of my invention illustrated in Fig. 4 involves the construction of a straight knife, having a heated blade and a single handle, which may be employed in the same manner as the knives formerly used.

A handle 74, which may be constructed of wood or other suitable material, is provided with an axially disposed opening 75 throughout a portion of the length of the handle, and a larger opening 76 aligned therewith. A piece of steel tubing 77, adapted to fit snugly within the opening 75, extends through the opening 76 and is provided with an enlarged threaded portion 78 at a point beyond the handle. The portion 78 is threaded into a short piece of copper tubing 79 and a copper plug 81 is also threaded into the opposite end thereof.

Within the chamber defined by the tube 79, I have arranged a heating element 82, which is of well known standard construction and comprises a dielectric core of porcelain or other suitable material wound with a large number of turns of high resistance wire. The heating element 82 is connected with a suitable source of electrical energy by means of the wires 83. A coil spring 84 is arranged about the wires 83 and is securely fastened to the handle 74 at one end in order to prevent the wires 83 from being easily broken. A straight strip of steel 85, provided with a flange 86 upon one edge thereof throughout its entire length is welded or otherwise securely fastened to the tubular member 79 and the plug 81.

I do not desire to be limited to a construction involving the use of a plug 81, as it is obvious that the heating element 82 may extend throughout the length of the knife, but with a heating element such as I have employed, I find the length of element approximately as shown by Fig. 4 to be sufficient. The plug has been provided merely for the purpose of conducting heat from the vicinity of the coil to the portion of the blade that extends therebeyond.

The form illustrated in Fig. 4, which I have just described in detail, may be employed in a manner similar to any straight knife and the function and result of the operation of the cutting blade 85 is precisely the same as the operation of the blade illustrated by Fig. 1.

From the foregoing description, it will be apparent that I have constructed a tool which is readily adaptable to many uses and that the tool is especially adaptable to cutting rubber tubing without injuring the mandrels upon which the tubing is supported. A tool, such as I have described, makes practical the use of aluminum mandrels in the manufacture of pneumatic tubes and the refinishing operation formerly necessary with any type of mandrel is entirely obviated.

Although I have illustrated but the preferred forms which my invention may assume and have described those forms in detail, it will be apparent to those skilled in the art that the invention is not so limited but that various minor modifications and changes may be made therein without departing from the spirit of my invention or from the scope of the appended claims.

What I claim is:

1. A cutting tool provided with a metallic blade of relatively low electrical conductivity, terminals associated therewith adapted to direct an electrical current therethrough and means adapted to confine the flow of energy between the terminals to the region immediately adjacent the cutting edge of the blade.

2. A cutting tool provided with a blade having a recess immediately opposite the cutting edge thereof and a circuit adapted to supply electrical energy to the blade between the recess and the cutting edge.

3. A cutting tool provided with a blade having a cutting edge of relatively high resistance material, a plurality of recesses formed in the blade opposite the cutting edge and an electrical terminal associated with either extremity of the blade.

4. A cutting tool comprising a blade provided with recesses therein opposite the cutting edge thereof and a handle operatively associated with the blade.

5. A cutting tool comprising a pair of arms pivoted together, cutting means operatively associated with one of the arms means adapted to heat the cutting means and a plurality of rollers rotatably mounted on the second arm.

6. A cutting tool comprising a pair of arms pivoted together, one of the arms being provided with a cutting blade, means adapted to supply heat energy to the blade and roller members operatively associated with the other arm.

7. A cutting tool comprising a pair of pivoted arms, one of the arms being provided with a cutting blade, means adapted to supply heat energy to the blade, roller members operatively associated with the other arm and a handle for the tool.

8. A cutting tool comprising a pair of arms pivoted together, one of the arms being provided with a cutting blade and resilient means adapted to maintain the arms in cutting relationship with the article operated upon.

9. A cutting tool comprising a pair of pivoted arms, one of the arms being provided with a cutting blade, resilient means adapted to maintain the arms in closed relationship upon the article to be operated upon and means adapted to render the first mentioned means ineffective.

10. A cutting tool comprising a pair of arms pivoted together, one of the arms being provided with a cutting blade, a crank journalled in one of the arms, a spring secured at its extremities adjacent the outer portion of the crank and to the other arm, and a stop adjacent the crank adapted to prevent the rotation thereof in one direction.

11. A cutting tool comprising a pair of arms pivoted together, one of the arms being provided with a cutting blade, a crank journalled in one of the arms, a spring secured at one extremity adjacent the outer portion of the crank, an adjustable member operatively associated with the other arm being adapted to support the other extremity of the spring, and a stop adjacent the crank adapted to prevent the rotation of the crank in one direction.

12. A cutting tool comprising a pair of pivoted arms, one of the arms being provided with an electrically heated blade, a pair of handles for the arms, one of the handles being provided with a socket adapted to receive a terminal plug, roller members for the arm opposite the blade, a resilient member associated with the arms and means adapted to render the member ineffective.

In witness whereof, I have hereunto signed my name.

EDWARD C. KASTNER.